United States Patent [19]
Klein

[11] 3,985,626
[45] Oct. 12, 1976

[54] ARRANGEMENT FOR REGULATING THE DISTILLATE HEIGHT LEVEL IN THE DEGASSING STAGE OF AN EVAPORATION INSTALLATION

[75] Inventor: Guenther Klein, Vienna, Austria

[73] Assignee: Vereinigte Edelstahlwerke AG, Vienna, Austria

[22] Filed: Dec. 5, 1974

[21] Appl. No.: 529,977

[30] Foreign Application Priority Data
  Dec. 7, 1973  Austria .............................. 10280/73

[52] U.S. Cl. ................................. 202/202; 202/182; 202/203; 55/164; 55/165; 55/169; 55/170; 137/398; 137/409; 137/565; 137/428; 159/43 R; 159/44

[51] Int. Cl.² ...................... B01D 3/00; B01D 19/00

[58] Field of Search ........... 202/203, 202, 204, 182, 202/160, 193–198, 201; 55/164, 165, 169, 170; 137/398, 409, 571, 565, 428 X, 430, 569, 386; 159/43, 44

[56] References Cited
UNITED STATES PATENTS

| | | | |
|---|---|---|---|
| 491,659 | 2/1893 | Lillie | 159/43 R X |
| 2,193,483 | 3/1940 | Hinckley | 159/44 X |
| 2,568,506 | 9/1951 | Mercek | 137/398 X |
| 2,664,391 | 12/1953 | Coulter | 202/181 X |
| 3,293,151 | 12/1966 | Holzer et al. | 202/181 |

*Primary Examiner*—James M. Tayman, Jr.

[57] ABSTRACT

An improved liquid level regulator is associated with the reservoir of a degassing stage of an evaporation installation wherein a pump connected to the output of such degassing stage is effective to propel the distillate at an ideally constant rate out of the degassing stage to a suitable utilization device. A feedback path is connected between the pressure outlet of the pump and the suction input thereof via a float valve. The float valve communicates with the degassing stage in such a manner that changes in the distillate level of the degasser reservoir effect corresponding changes in the liquid level of the float valve, whereby a constant level of such distillate in the reservoir of the degasser is maintained.

2 Claims, 2 Drawing Figures

ARRANGEMENT FOR REGULATING THE DISTILLATE HEIGHT LEVEL IN THE DEGASSING STAGE OF AN EVAPORATION INSTALLATION

BACKGROUND OF THE INVENTION

In many evaporation installations, degassing stages are employed for volatizing residual gasses remaining in the distillate after the main evaporation operations take place. The distillate is propelled out of the degassing stage by means of a pump whose suction inlet is connected to the output of the degassing stage and whose pressure outlet is typically connected to a cooling stage for reducing the temperature of the distillate emitted from the degassing stage for purposes of subsequent effective utilization.

The degassing stage typically has a reservoir in the bottom portion thereof for generating stripping vapor and collecting the distillate after the residual gases are expelled therefrom. Consequently, when the pump is propelling the distillate out of the degassing stage at a desired rate, a correspondingly predetermined liquid height level of the distillate in the reservoir is maintained. Since variations in the height of the column in the reservoir are indicative of variations in the rate of flow of the distillate, it has been common in the past to provide liquid height level probes to monitor the liquid height level, and regulation valves to maintain such level constant. Unfortunately, regulation schemes of the known type are susceptible to errors and disturbances. Particularly in nuclear installations it may be very expensive to meet the stringent specifications for the above mentioned devices for the control of the liquid height level.

SUMMARY OF THE INVENTION

These problems are overcome with the improved arrangement for regulating the distillate height level in the reservoir of the degasser. A liquid feedback path is coupled between the pressure outlet of the pump and the suction input thereof through a float valve. The float valve communicates with the degassing stage in such a way that changes in the distillate level in the reservoir effect corresponding changes in the liquid level of the float valve.

With such an arrangement, a decrease in the rate of flow of distillate while the pump is operating under constant flow conditions will cause the liquid level in the reservoir to decrease to compensate for the decreased flow. The resulting reduction in the distillate level in the reservoir will effect a corresponding reduction in the liquid level in the float valve, so that the latter will open to render operative the feedback path between the outlet and inlet of the pump. The quantity of distillate formerly drawn off from the reservoir of the degassing stage because of the pump requirements will now be shifted to the feedback path via the float valve, so that the liquid level in the reservoir will be permitted to rise again. The latter, in turn, will cause the liquid level in the float valve to rise, and when such latter increase has reached a level corresponding to the restored predetermined distillate level in the reservoir, the float valve will close again to terminate the feedback operation.

BRIEF DESCRIPTION OF THE DRAWING

The invention is further set forth in the following detailed description taken in conjunction with the appended drawing, in which.

DETAILED DESCRIPTION

Figure 1:
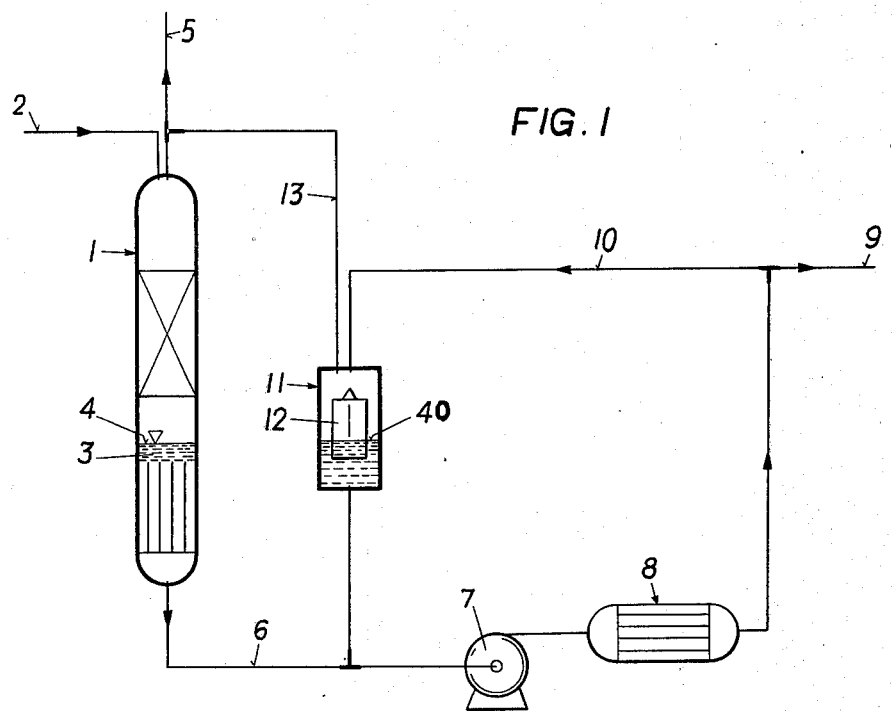
FIG. 1 is a schematic diagram of a degassing stage having associated therewith an arrangement for regulating the distillate height level in the degassing stage reservoir.

Referring now to the drawing, the reference numeral 1 designates a conventional degassing stage to an upper portion of which distillate generated from a conventional multi-stage evaporation station is conducted via a pipe 2. Within the degassing stage, the residual gases in the distillate are volatized and discharged via a conductor 5, and the degassed distillate is collected in a reservoir 3 disposed at the bottom of the degassing stage.

The distillate arriving at the degassing stage 1 and collected in the reservoir 3 is propelled by a pump 7 at an ideally constant rate to a utilization device (not shown) via an outlet pipe 9. The distillate exiting from the reservoir 3 is preferably cooled by means of a cooling stage 8 disposed between the pressure outlet of the pump 7 and the discharge pipe 9.

Variations in the height of the liquid surface 4 in the reservoir 3 are indicative of variations in the rate of flow of the distillate through the degassing stage 1. Therefore, suitable sensing and regulation means are provided in the arrangement shown of FIG. 1 for maintaining the liquid height level of the surface 4 at a predetermined level.

In accordance with the invention, such sensing and regulation facilities includes a feedback path connected between the pressure outlet of the pump 7 and the suction inlet thereof. Such feedback path includes a pipe 10 which, in the illustrative arrangement of FIG. 1, extends from the output of the cooling stage 8 to the pump suction input via a float valve 11. The float valve 11 communicates with the degassing stage 1 via pipe 13 in such a manner that variations in the height of the liquid surface 4 in the reservoir 3 lead to corresponding changes in the height of the surface (designated by the numeral 40) in the liquid contained in the float valve 11. In particular, the liquid height level in the float valve 11 is arranged such that the valve will open whenever the level of distillate in the reservoir 3 diminishes from its predetermined value by a prescribed amount, and will close again whenever such reduced liquid level in the reservoir again rises to its predetermined value.

Figure 2:
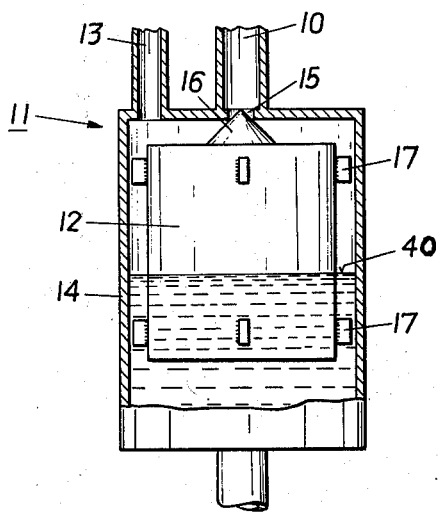
FIG. 2 is an elevation view, partially in section, of a float valve suitable for use in the arrangement of FIG. 1.

As shown best in FIG. 2, the float valve 11 includes an outer casing 14 and an inner float 12 which is guided for vertical movement within the casing 14 by means of projection 17—17. A conical valve 16 is disposed at the top of the float 12 such valve 16 cooperating with a valve seat 15 to establish a communication path between the feedback pipe 10 and the interior of the unit 11 whenever the height of the surface 40 of the liquid level in the unit 11 drops below its preset value.

In the operation of the arrangement of FIG. 1, wherein the pump 7 is assumed to be operating at a constant capacity, a reduction in the flow rate of the distillate through the degassing stage 1 will cause the pump to obtain its excess liquid requirements from the reservoir 3 of the degassing stage 1. As a result, the height of the surface 4 of the distillate column in the reservoir 3 will decrease, leading to a corresponding reduction in the height of the surface 40 of the liquid level in the float valve 11.

The resulting drop in the level of the float 12 will open the float valve 11 and will thereby render operative the liquid feedback path around the pump 7. In particular, because of such feedback effect, a portion of the liquid at the output of the cooling stage 8 will be routed back to the suction input of the pump 7, and is thereby substituted for the excess distillate obtained by such suction input from the reservoir 3. Accordingly, the liquid level in the reservoir 3 is again permitted to rise, whereby the float 12 in the valve arrangement 11 is correspondingly raised. As soon as the liquid level in the reservoir 3 has again risen to its present value, the corresponding liquid level in the float valve 11 will have reached its position effective to close the valve and thereby disable the feedback path 10.

Thereafter, if necessary, a similar cycle of liquid height regulation in the reservoir 3 can be effected in a similar manner.

In the foregoing, the invention has been described in connection with a preferred arrangement thereof. Many variations and modifications will now occur to those skilled in the art. For example, the location of the inlet of the feedback path can be located elsewhere than that indicated in FIG. 1, and in particular can be connected to the junction between the outlet port of the pump 7 and the input of the cooling stage 8, rather than at the output of such cooling stage. It is accordingly desired that the scope of the appended claims not be limited to the specific disclosure herein contained.

What is claimed is:
1. An evaporation installation having a degassing stage to which distillate from the installation is introduced and which has a reservoir in which the distillate is collected, and a pump having a suction inlet coupled to the reservoir for propelling distillate out of the reservoir to maintain a predetermined level of distillate in the reservoir, and first conduit means coupled to a pressure outlet of the pump for propelling a first portion of the distillate out of the installation, an arrangement for regulating the height of the distillate liquid level in the reservoir, which comprises, in combination, a float valve having a valve seat, a float chamber and a float movable in the float chamber to cooperate with the valve seat, the float being movable in accordance with the liquid level in the float chamber, second conduit means coupled to the pressure outlet of the pump for coupling a second portion of the distillate to the valve seat of the float valve, means coupling the float chamber to the suction inlet of the pump to complete a feedback path from the pressure outlet to the suction inlet directly through the valve seat of the float valve, and equalizing means coupling the upper portion of the float valve to the upper portion of the degassing stage to vary the liquid level in the float chamber in accordance with the liquid level in the reservoir so that when the liquid distillate rises above a predetermined level in the reservoir said float closes said valve seat.

2. An installation as defined in claim 1, in which the installation further comprises a cooling stage coupled to the pressure outlet of the pump, and in which the inlet port of the feedback path is connected to the output of the cooling stage.

* * * * *